Sept. 24, 1963     H. E. SCHAUWECKER     3,105,187
TRANSISTORIZED ELECTRONICALLY REGULATED POWER SUPPLY
Filed Jan. 20, 1959     3 Sheets-Sheet 1

INVENTOR.
HARRY E. SCHAUWECKER
BY William T. O'Neil
AGENT

Sept. 24, 1963     H. E. SCHAUWECKER     3,105,187
TRANSISTORIZED ELECTRONICALLY REGULATED POWER SUPPLY
Filed Jan. 20, 1959     3 Sheets-Sheet 2

INVENTOR.
HARRY E. SCHAUWECKER
BY William T. O'Neil
AGENT

INVENTOR.
HARRY E. SCHAUWECKER
BY William T. O'Neil
AGENT

United States Patent Office 3,105,187
Patented Sept. 24, 1963

3,105,187
TRANSISTORIZED ELECTRONICALLY REGULATED POWER SUPPLY
Harry E. Schauwecker, Portuguese Bend, Calif., assignor to Valor Electronics Incorporated, Gardena, Calif., a corporation of California
Filed Jan. 20, 1959, Ser. No. 787,946
7 Claims. (Cl. 323—22)

The present invention concerns electronic voltage regulators and more particularly electronic voltage regulators employing transistors as active elements.

The prior art in the field of electronic voltage regulators in which vacuum tubes are employed as the active elements is extensive. More recently the advance of the general electronic arts has resulted in the employment of transistors in steadily increasing numbers. The peculiar advantages of the transistor over its older counterpart the vacuum tube, have brought about this trend toward the use of transistors. In order that regulated electronic power supplies to be used with transistor circuits should exhibit the same ruggedness, long life, and high power efficiency, as the transistor circuits which they power, the need for transistorized electronic regulated power supplies is evident. In the present state of the transistor art, the transistor is inherently a device which operates with much lower energizing potentials than most vacuum tubes. Accordingly, electronically regulated vacuum tube power supplies are not efficiently adapted to supply power to transistor utilization circuits.

The transistor art and the techniques being developed have imposed requirements for high quality performance from transistorized regulator circuits. Power supply designs thus far evolved in transistorized form have provided regulation and general performance of considerable less quality than has been hitherto available from vacuum tube regulators. This has been true because vacuum tube techniques have not been applicable to transistor circuitry and accordingly new engineering principles have been needed and have evolved gradually.

Prior to the most recent developments in transistorized regulator circuit design, these regulators have been particularly vulnerable to variations in the regulator input supply. In view of this disadvantage and other limitations of the prior art which will be further evident as this specification proceeds, it is an object of the present invention to design an improved transistorized electronic voltage regulator which is relatively insensitive to input voltage variations.

It is a further object of the present invention to provide a transistorized electronic voltage regulator which has a greatly improved ability to eliminate the effect of regulator input source variations of a transient nature.

It is a further object of the present invention to provide a transistorized electronic voltage regulator which is inherently capable of protecting the transistors therein against the deleterious effects of voltage surges at the input of the said regulator circuit.

For the purposes of illustration of the present invention, drawings have been provided, briefly described as follows.

The prior art is probably best represented by an article which appeared in the proceedings of the Institute of Radio Engineers in November 1957 (volume 45, No. 11, published by the Institute of Radio Engineers Incorporated at 1 E. 79 Street, New York, N.Y.). This article, written by R. D. Middlebrook and entitled "Design of Transistor Regulated Power Supplies," discusses the art prior to that time and advances the circuit shown here at FIGURE 2 as a solution to the problem of improved regulation, particularly against variations in supply voltage occurring ahead of the regulator circuit. In order to establish the entire background for the present invention and fully illuminate the problems solved by the present invention as well as to fully describe the operation and advantages of the present invention, a detailed description of the drawings will be undertaken.

Figure 1:
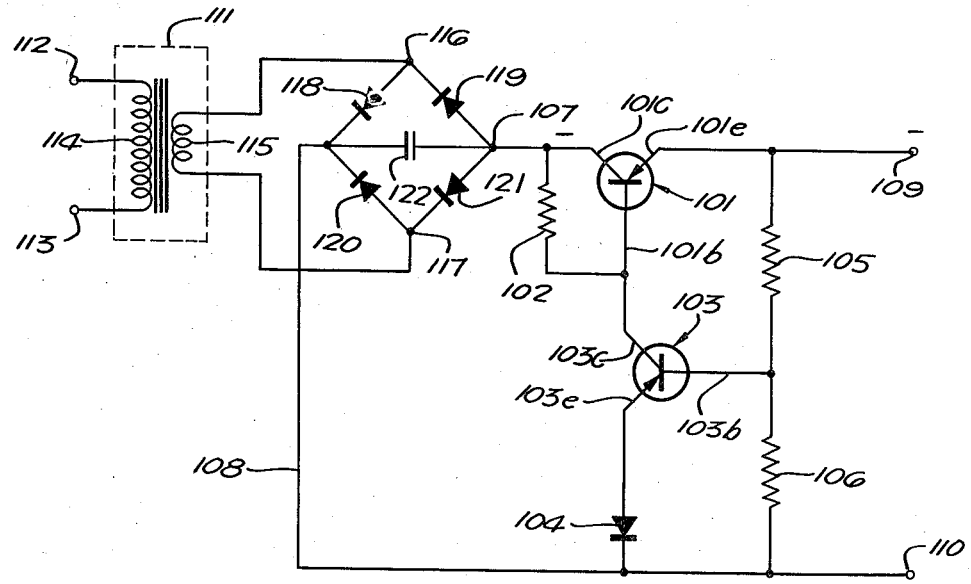
FIGURE 1 is a schematic diagram of a simple form of prior art transistorized electronic voltage regulator circuit complete with A.C. transformer and rectifier elements associated therewith.

Referring first to FIGURE 1, the circuit shown is a relatively simple rectifier and regulator combination, using P.N.P. transistors, in which no particular effort has been made to compensate against input voltage variations.

The circuit of FIGURE 1 is highly suggestive of the common seriese regulator vacuum tube configuration in which transistor 103 corresponds to a stage of error voltage amplification. A standard step-down transformer 111 having a primary winding 114 and a secondary winding 115 is shown with primary terminals 112 and 113. It may be assumed that terminals 112 and 113 would be connected to a commonly available source of alternating current such as 115 volts 60 cycles. Secondary 115 supplies a rectifier circuit in which diodes 118, 119, 120 and 121 are arranged in a standard bridge configuration. Bridge points 116 and 117 are the A.C. input points, and 107 and 108 constitute the direct current output terminals. Capacitor 122 provides a measure of filtering or smoothing of the rectified A.C. Of course, a more elaborate filter involving several sections of inductance-capacity filters or any other known configuration of filters could have been used if more effective pre-regulator filtering had been desired. The diodes 118, 119, 120 and 121 could be germanium or silicon semiconductor diodes, or they could also be selenium rectifier sections or even copper oxide rectifier sections, all of these forms of rectifier being well known in the electronic arts. The filtered bridge output voltage of FIGURE 1 will be negative as shown at 107 and positive on 108.

A transistor of suitable current carrying capacity 101 is inserted as a series regulating element between 107 and the negative output terminal of the regulator 109. A load or utilization device would be connected between negative terminal 109 and positive terminal 110. Either 109 or 110 could be referenced to ground or any other external potential as long as the ordinary design considerations, such as the insulation of transformer 111 and the suitable isolation of all the parts of the circuit from physical contact with ground or the other reference potential, are observed.

Transistor 101 acts as a controllable series regulating element. It could be thought of as a variable resistance or impedance inserted in series between the source represented by the rectifier and filter and the load or utilization device applied at terminals 109 and 110. This variable resistance or impedance exists between the collector electrode 101c and the emitter electrode 101e, and in accordance with well know transistor circuit theory the current caused to flow through the base electrode 101b may be thought of as determining the magnitude of the said variable resistance or impedance. A circuit including resistor 102, the collector 103c, emitter 103e (of transistor 103) and Zener diode 104 carries a current which is controlled in accordance with the voltage at the base, 103b, of transistor 103. Thus the current through resistor 102 is variable in accordance with the current through the collector-emitter circuit of transistor 103, and a corresponding variable current is thus caused to flow in the base 101b of transistor 101. It will be noted that the Zener diode 104 is placed in a circuit in reverse polarity. In other words the anode of diode 104 is connected to the emitter 103e and the cathode of diode 104 is returned to the common positive terminal of the power supply (i.e. 108 or 110) at the output.

It is well known that a Zener diode when operated with a reverse voltage applied beyond a predetermined critical point, maintains a voltage drop across itself which is substantially independent of the current therethrough. It is this characteristic of the Zener diode which makes it useful for a reference source. In vacuum tube applications rare gas glow tubes which exhibit a similar characteristic are extensively used, however practical rare gas glow tubes operate at impractically high voltages for convenient use in transistor circuits. Dry cell batteries of various types and of suitable voltages have been applied as reference elements corresponding to 104, and of course such an alternative could have been employed in the circuit of FIGURE 1, or for that matter in the circuits of all other figures.

Figure 2:
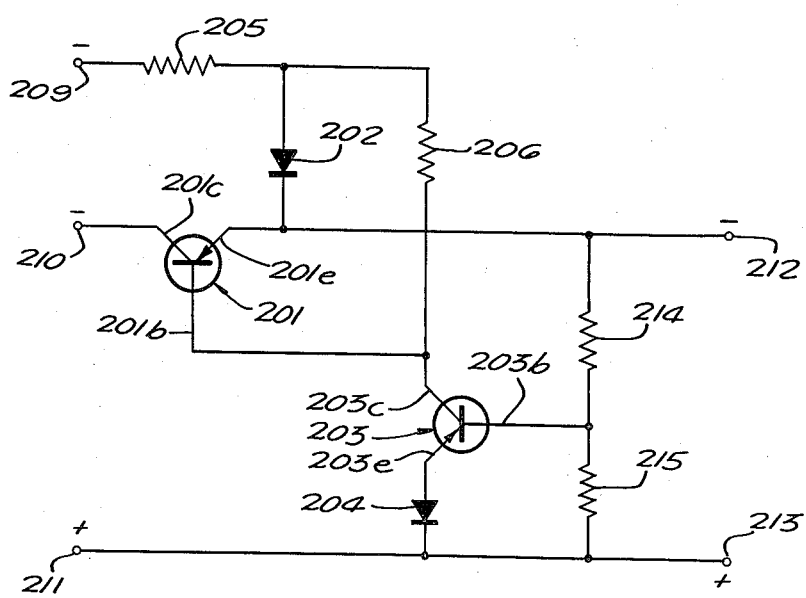
FIGURE 2 is a schematic diagram of a prior art transistorized voltage regulator circuit with prior art means for reducing the sensitivity of the circuit to input voltage variations.
Figure 3:
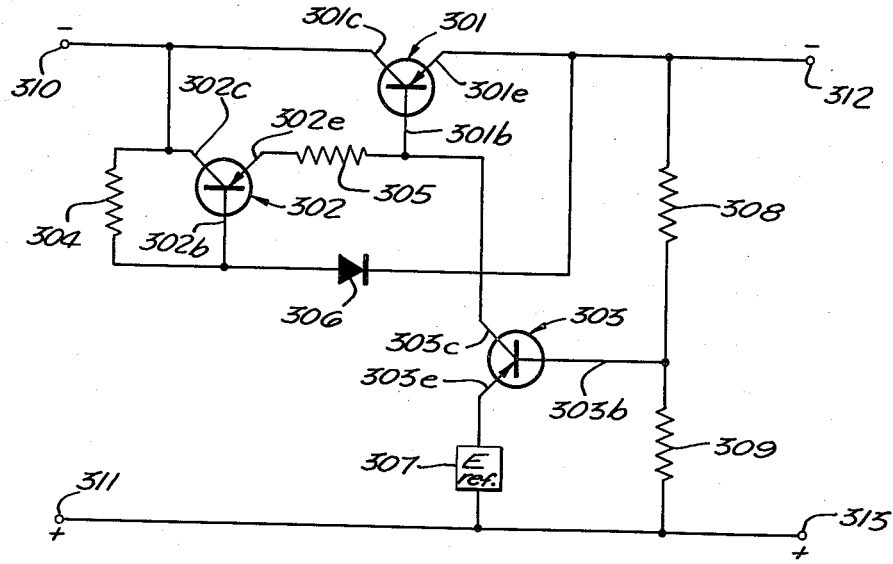
FIGURE 3 is a schematic diagram of one embodiment of the present invention using P.N.P. transistors.
Figure 4:
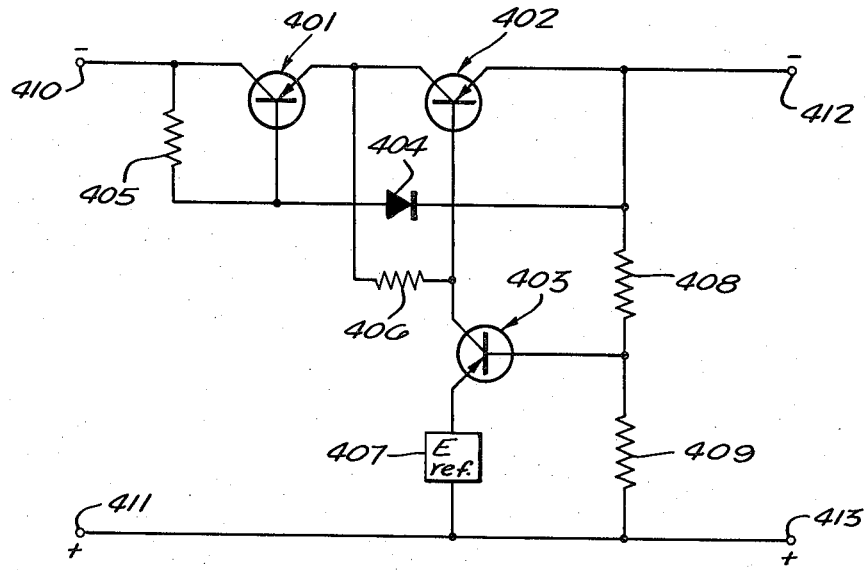
FIGURE 4 is a schematic diagram of an additional embodiment of the present invention.
Figure 5:
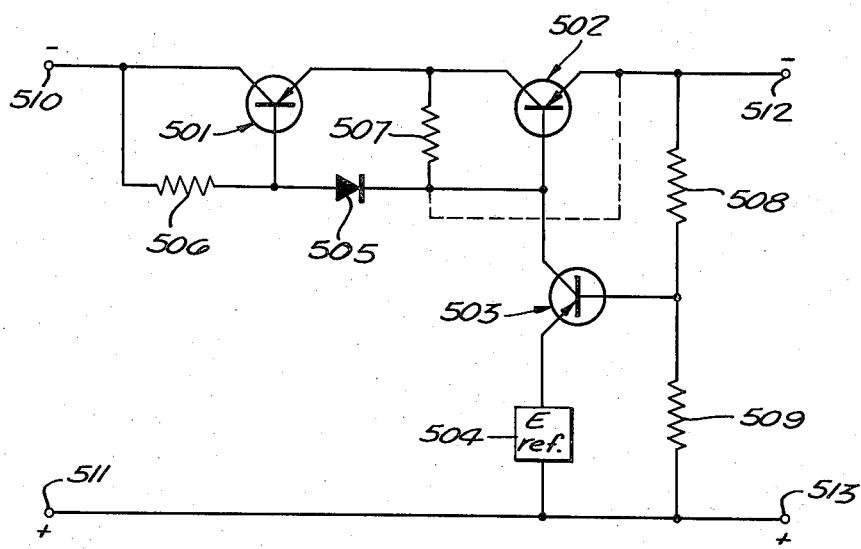
FIGURE 5 is a schematic diagram of another embodiment of the present invention.

The consideration of these particular circuit details has been undertaken at this point so that the more germane details of the present invention can be considered in connection with FIGURES 3 through 5 without repetitious discussion of those aspects of the circuit which are common with the prior art circuitry shown in FIGURES 1 and 2.

If the base-to-emitter voltage of transistor 103 is assumed to be zero, if the base current of transistor 103 is neglected compared to the current through the potential divider consisting of resistors 105 and 106, and if the base current of transistor 101 is neglected compared to the collector-to-emitter circuit current of transistor 103 then the entire circuit of FIGURE 1 may be considered to be "in balance" when the output voltage between terminals 109 and 110 multiplied by a factor obtained by dividing the value of resistor 106 by the sum of the values of resistor 105 and 106 is equal to the reference potential existing across 104. In actual practice the approximations suggested above are relatively valid since the base-to-emitter drop in a practical transistor type at 103 is not likely to exceed $\frac{1}{10}$ or $\frac{2}{10}$ of a volt. Moreover the divider current through 105 and 106 would, in a practical design, be at least 10 or 20 times greater than the base current of transistor 103. Similarly the base current of transistor 101 would surely be very small compared to the current flowing in resistor 102 and through the collector-emitter circuit of transistor 103.

It may be stated as a summary statement of regulator operation that the inverse feedback path around a loop including resistor 105, transistor 103, and transistor 101 operates so as to adjust the internal resistance of the emitter-collector circuit of transistor 101 to a value which will always establish, for any value of current drawn between terminals 109 and 110 within the design limitations, a voltage between the said terminals 109 and 110 which when fractionated by the voltage divider 105 and 106 results in a base voltage for transistor 103 which is equal to the sum of the voltage across the reference element 104 and the emitter-to-base voltage drop of transistor 103.

Whereas the description above describes the output voltage regulating function of the regulator, nothing has as yet been said concerning the sensitivity of the circuit to voltage changes appearing between 107 and 108 due to either IR drops in components from the bridge output back to the A.C. line terminals 112 and 113, or to actual fluctuations in the alternating current supply.

At this point it may be well to point out a significant departure in the general analogy between the vacuum tube regulator case and the transistor regulator case. If transistor 103 were instead a vacuum tube amplifier particularly of the pentode type (which is well adapted to such an application), comparatively little plate current change would result from a change of voltage between 107 and 108. This is true because of the "flat" plate characteristic of the said pentode vacuum tube. Stated otherwise it may be said that the pentode possesses an extremely high dynamic plate impedance and therefore the input voltage change inferred would result in no appreciable increase of plate current and therefore no appreciable change of current through any reference element in the cathode circuit (analogous to 104). In the case of the transistor circuit, however, the collector-to-emitter circuit of 103 represents a relatively low dynamic impedance and consequently input voltage changes will tend to change the current through any reference element in the cathode circuit of transistor 103, and the reference element 104.

The article by Middlebrook, explains in greater detail and through the presentation of an algebraic analysis the fact that transistor 103 is in effect called upon to compensate not only for output voltage changes between 109 and 110 when the current drawn between 109 and 110 externally varies, but also transistor 103 must compensate for the input voltage variation caused by the same change of current passing through the internal resistance of the rectifier bridge, etc. If the supply end of resistor 102 could be held at a stabilized voltage, the performance of the circuit against line voltage changes would not only be improved, but the transistor 103 would be relieved of the requirement to compensate for the latter of these two internal effects. Thus, for the same gain from transistor 103, stabilization of the voltage supply to transistor 206 in FIGURE 2 has been the further effect of reducing the output impedance between terminals 212 and 213.

In the circuit of FIGURE 2, terminals 210, 211, 212 and 213 corerspond to 107, 108, 109 and 110 from FIGURE 1 respectively. Transistor 201, moreover, corresponds in function to transistor 101 as does transistor 203 correspond to transistor 103. Reference element 204 likewise performs the same function as reference element 104 and resistors 214 and 215 may be identical to resistors 105 and 106 respectively. If a source of voltage at 209 slightly more negative than at terminal 210 is available, a resistor 205 and additional Zener diode 202 may be used to establish a voltage at the junction of resistors 205 and 206 which is regulated by the Zener characteristic of 202 and is therefore substantially independent of variations at 209. It will be noted that the voltage across 202 is referenced to, and will be only slightly higher than, the emitter voltage at 201e. The load resistor 206 at its point of connection with the collector 203c of transistor 203 develops the control voltage which is applied to the base 201b of transistor 201. The circuit of FIGURE 2 has a significant advantage over the circuit of FIGURE 1 in that the transistor 203 is not required to compensate for input voltage changes which cause current variation in the collector-emitter path of transistor 203. Moreover, second order effects due to the broader current excursions through 104 in FIGURE 1 as compared to the more limited current excursions through 204 in FIGURE 2 results in another advantage for the circuit of FIGURE 2, since the Zener diodes 104 and 204 do not have infinite dynamic impedance characteristics.

The circuit of FIGURE 2 does exhibit the significant disadvantage however that normal operating changes of current in the collector-emitter circuit of transistor 203 change the current through resistor 205 as well as through resistor 206. This results in some change in the voltage across diode 202 since its dynamic impedance characteristic is obviously not perfectly "flat."

The circuit of FIGURE 3 has terminals 310, 311, 312, 313, resistors 308, 309, and transistors 301 and 303 which correspond functionally to terminals 107, 108, 109, and 110, resistors 105 and 106 and transistors 101 and 103 respectively. In FIGURE 3, a generalized reference 307 is shown, since as pointed out before, elements other than the Zener diode 306 corresponds in function to 202 in FIGURE 2, and a series resistor 304 acts as a current limiting resistor (as 205). Thus the voltage drop across 306 is developed with respect to 301e but is applied to the base 302b of transistor 302 rather than directly to resistor 305. With its collector 302c connected directly to the negative potential source, the emitter 302e of transistor 302 will tend to follow the base 302b very closely within the range of operating limits. Also, variations in current drawn by 302b are negligible compared to the current through resistor 305. Not only is it now unnecessary that resistor 304 and diode 306 be supplied from a more negative voltage than at terminal 310 (the circuit of FIGURE 2 having required such a more negative source) but also resistor 305 operates from a far "stiffer" source of voltage than does resistor 206 in FIGURE 2. In this way the circuit of FIGURE 3 affords a very significant improvement in quality of regulation obtainable and a further reduction in output impedance beyond that achieved through the use of the prior art circuit of FIGURE 2.

Tests of the circuit of FIGURE 3 have shown that for the same circuit gain, it is capable of providing regulation of substantially higher quality than the circuit of given FIGURE 2. Furthermore, the output impedance exhibited between terminals 212 and 213 in FIGURE 2 may be high enough to introduce interaction among various circuits drawing power from the FIGURE 2 circuit due to the "common impedance" effect, and the advantage of the circuit of FIGURE 3 with its much lower output impedance is therefore likely to be even of more importance than the improved regulation in some applications.

Figure 3A:
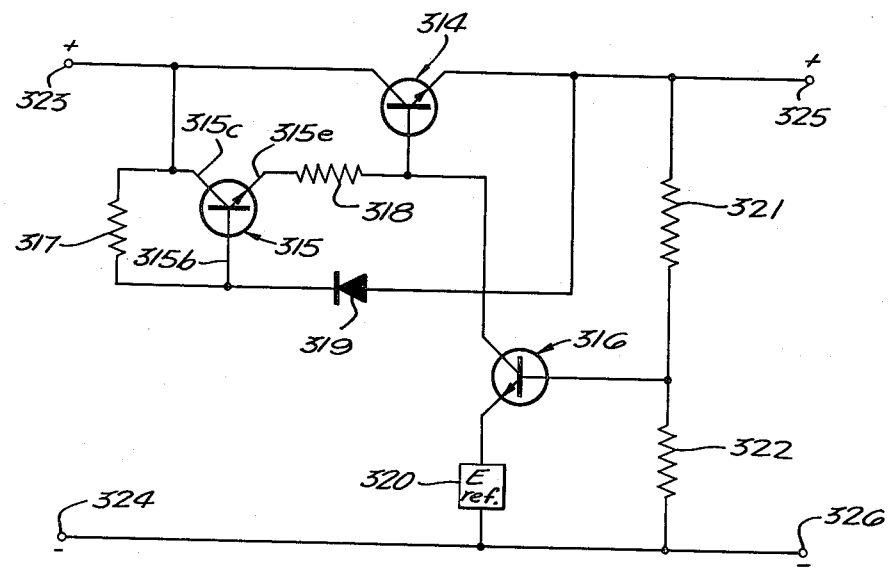
FIGURE 3a is an exact counterpart of the circuit of FIGURE 3 except that N.P.N. transistors are used.

For purposes of illustration, the circuit of FIGURE 3a is included simply to demonstrate that this embodiment of the invention (FIGURE 3) or for that matter any other embodiment of the present invention can be readily instrumented with NPN rather than PNP transistors. In FIGURE 3a it will be apparent that transistors 314, 315, and 316 correspond to transistors 301, 302, and 303. The reversal of polarity at the input terminals 323 and 324 and also at the output terminals 325 and 326 is in keeping with the nature of the NPN transistors used in FIGURE 3a. Resistors 317, 318, 321, and 322 are fully comparable in their function to resistors 304, 305, 308 and 309. It will be noted that the diode 319 is reversed in polarity as compared to diode 306, i.e. diode 319 has its cathode toward the base of transistor 315, whereas diode 306 has its anode toward the base of transistor 302. Similarly, the generalized reference 320 would be reversed in polarity such that if it were the previously discussed Zener diode voltage source, its cathode would be connected to the emitter of transistor 316.

Another significant advantage normally provided by an effective electronic voltage regulator is the reduction of ripple and transient voltage variations which are passed on from the rectifier-filter circuits. Herein lies another significant disadvantage of the prior art circuit of FIGURE 2. Since the combination of current limiting resistor 205 and Zener diode 202 must be compromised because of the operating current variations through resistor 206, it follows that an optimum selection of resistance 205 in view of possible ripple and transient variations at terminal 209 cannot be made. In the circuits of 3 and 3a however, transistors 302 and 315 act to relieve the Zener diode regulator circuits of this compromise, since there is substantially no variation in the base current of transistor 302 or 315. Stated otherwise, it may be said that in the FIGURE 3 or 3a circuits, the full current range or voltage range from the Zener diode breakdown point to the maximum permissible inverse voltage or current can be devoted to the absorption by diodes 306 and 319 of input variations including ripple and transients.

In the circuit of FIGURE 4, a variation or additional embodiment of the present invention is shown in which transistors 402 and 403 correspond to transistors 301 and 303 from FIGURE 3 resistors 405, 406 and 409 moreover function the same as do resistors 304, 305, 308 and 309 from FIGURE 3. Zener diode 404 and reference 407 moreover correspond to the diode 306 and reference 307. Since FIGURE 4 is also shown with PNP transistors used, there is also a correspondence of the input terminals 410 and 411 and the output terminals 412 and 413 with their counterparts in FIGURE 3, insofar as polarity is concerned.

In FIGURE 4, transistor 401 passes the entire load current through its collector-emitter circuit as does transistor 402. Transistor 401 of course also carries the relatively much smaller collector-emitter circuit current of transistor 403 through resistor 406 in a manner previously explained in connection with FIGURE 3. The embodiment of FIGURE 4 thus requires a transistor at 401 which has a current carrying capacity equal to or slightly greater than transistor 402. Essentially all the advantages discussed in connection with FIGURES 3 and 3a accrue to the circuit of FIGURE 4 plus an additional marked advantage in quality of overall voltage regulation. The effect of transistors 401 and 402 being connected in series in a manner shown improves the overall regulation so significantly because it is in this way possible to obtain very nearly the product of the two regulating factors of these transistors. Also there is a large reduction in the ripple at the midpoint between transistors 401 and 402 and a much larger reduction at the output terminals. It goes without saying, of course, that the output impedance of the circuit of FIGURE 4 would be expected to be further reduced over that obtainable with that of FIGURES 3 or 3a. In addition to these advantages set forth for the circuit of FIGURE 4, it is also significant that transistors 401 and 402 divide the voltage drop extant between 410 and 412 in any given condition. It follows that the power to be dissipated by each of these transistors is less since the dissipation of power in each is proportional to the voltage drop assumed across each of these transistors. Obviously, a larger amount of current or net output power between terminals 412 and 413 can thereby be thus regulated than with a single transistor in the series path of any given power rating.

Referring now to FIGURE 5, terminals 510, 511, 512 and 513 will be seen to correspond to terminals 410, 411, 412 and 413 from FIGURE 4. Similarly, there is correspondence between the functions of transistors 501, 502 and 503 with the functions of transistors 401, 402 and 403. Resistors 507, 508 and 509 moreover perform corresponding functions as resistors 406, 408 and 409. Reference source 504, moreover, functions in a manner identical with 407.

It will be noted from FIGURE 5 that Zener diode 505 instead of being returned to the emitter of transistor 502, is instead returned to the base of transistor 502. Whereas the configuration of FIGURE 4 may have been said to be best adapted to "splitting" of the power dissipation between transistors 401 and 402 in addition to the other advantages accruing to the circuit of FIGURE 4, attention has been directed in the circuit of FIGURE 5 to maximizing the voltage variation absorption capability of transistors 501 and 502. One of the chief limitations of practical transistors is that of maximum voltage. In applications where the voltage applied from the rectifier and filter configuration to terminals 510 and 511 is expected to vary over a large excursion, the circuit of FIGURE 5 has a unique advantage achieved in returning the diode 505 cathode to the base of transistor 502. The circuit of FIGURE 5 operates to limit the collector-emitter voltage on transistor 502 to the operating voltage drop across the Zener diode 505. Since in both transistors 501 and 502 the emitter electrode tends to follow the base, the emitter of 501 is at a potential close to the operating drop across 505 with respect to the base of transistor 502. Since the emitter of 501 is directly connected to the collector of 502, the base-to-collector voltage of 502 is also limited by the operating voltage drop of 505.

If the Zener diode 505 is chosen such that it is below breakdown (that is it is operated with a reverse voltage less than the critical value for Zener operation), and resistor 506 is chosen so that for all normal input voltages and load currents, transistor 501 is in saturation, the collector-to-emitter voltage drop of the said transistor 501 will remain at a minimum few millivolts. Under these circumstances transistor 501 simply acts as a small series resistor ahead of transistor 502 and all normal circuit regulation is achieved through operation of transistor 502 in precisely the same manner as previously described (as for example in the circuit of FIGURE 3). Transients or ripple peaks between terminals 510 and 511 to the extent that they tend to reduce the instantaneous voltage between these terminals do not present the hazard of exceeding the voltage rating of transistor 502. In the other voltage sense however, if a substantial voltage transient between terminals 510 and 511 occurs, the Zener diode 505 exceeds its critical point and breaks down thereby moving the base of transistor 501 in the negative direction.

The precise choice of parameters would, of course, be made in this case such that the breakdown of the Zener diode 505 occurred before transient had caused the instantaneous voltage applied to transistor 502 to exceed its rating. After the Zener diode 505 breaks down, transistor 501 is removed from its saturated condition and can absorb voltage peaks in excess of the normal handling capability of 502. Thus if transistors 501 and 502 were identical, a 100% voltage surge or transient peak could be safely absorbed. As a design consideration, some additional advantage in the circuit of FIGURE 5 can be achieved if resistor 506 is returned to a point slightly more negative than terminal 510 so that transistor 501 may be held in saturation normally without resulting in extremely large currents through 505 when an increasing sense voltage surge does appear.

It will be apparent to those skilled in the art that additional transistor, resistor, and Zener diode combinations like 501, 506 and 505 could be cascaded ahead of these components such that still larger voltage transients could be absorbed. In such a case, the breakdowns of the associated Zener diodes could be staggered so that successive transient absorbing transistors (a plurality of 501 transistors) would come out of saturation and participate in the absorption of transient voltage successively as the input transient built up.

It will also be apparent to those skilled in the art that an additional transistor operating in the manner of 501 and its associated components could be added in the circuit of FIGURE 4 ahead of the input to transistor 401. In this way the power dissipation splitting feature of the circuit of FIGURE 4 could be combined with the transient absorbing feature of FIGURE 5.

The above and other changes and modifications will present themselves to those skilled in the art. The spirit and concept of the present invention are generic in nature, the drawings and specific embodiments submitted herewith being only illustrative. Accordingly, in keeping with the breadth of the present invention, I claim:

1. An electronic voltage regulator circuit which compensates for voltage variations at its own input, comprising the combination of: a pair of input terminals and a pair of output terminals, one terminal of each of said pairs of terminals being positive polarity and the other being of negative polarity; a first semiconductor device having at least a current input electrode, a current output electrode, and a control electrode capable of regulating the value of impedance effective between said input and output electrodes, said input electrode being connected to receive load current originating at one terminal of said pair of input terminals and said output electrode being connected to the one of said pair of output terminals of corresponding polarity; means comprising an impedance having first and second ends, and a second semiconductor device series connected to and forming a junction with said first end of said impedance and having at least a current input electrode, a current output electrode, and a control electrode connected to control current through said impedance thereby generating a control current at said junction; means applying said control current to said control electrode of said first semiconductor device; and additional means for stabilizing the voltage applied to said second end of said impedance, said additional means comprising a source of substantially constant reference voltage, and a third semiconductor device having at least a current input electrode, a current output electrode, and a control electrode, said control electrode being connected to receive said reference voltage and said current input and output electrodes being connected to pass at least the current originating from said one terminal of said pair of input terminals and passing through said impedance thereby to maintain said second end of said impedance at a voltage which remains substantially constant with respect to said reference voltage.

2. An electronic voltage regulator circuit of the series type employing inverse feedback to achieve regulation, having an input for accepting unregulated voltage and an output for supplying regulated voltage, comprising the combination of: a first impedance device of a type having a control electrode adapted to control a first current in response to a control signal, said first impedance device being connected in series with a current path between said input and said output; control signal generating means including a second impedance device connected to the input side of said first impedance device through a fixed impedance element, said second impedance device having a second control electrode connected to be responsive to errors in the voltage at said output and adapted to compare said errors to a source of substantially fixed voltage to generate said control signal at the junction of said fixed impedance element and said second impedance device; means applying said control signal to said control electrode of said first impedance device, thereby completing the path for said inverse feedback; and additional means between said fixed impedance element and said input side of said first impedance device, said additional means including a source of second stabilized reference voltage, a third impedance device having a third control electrode connected to said source of second stabilized reference voltage, said third impedance device being adapted to control a third current comprising at least said second current thereby establishing a substantially pre-regulated voltage source for said fixed impedance element substantially insensitive to operating variations in said second current.

3. In an electronic voltage regulator circuit which employs a semiconductor device, having a control electrode capable of establishing the effective internal resistance of said semiconductor in accordance with the magnitude of a voltage applied to said control electrode, as a series regulating element, the combination comprising: A source of control voltage for said control electrode including an impedance element connected at a first end to a separately stabilized supply voltage and at a second end to said control electrode and to a circuit having low dynamic impedance for controlling current in said impedance, thereby producing and impressing said control voltage on said control electrode; and means for supplying said separately stabilized voltage including a source of substantially constant reference voltage, and a second semiconductor having a second control electrode capable of establishing the effective internal resistance of said semiconductor in accordance with the magnitude of a voltage applied to said control electrode, said reference voltage being applied to said control electrode, thereby supplying a regulated voltage to, substantially independent of, the current through said impedance element.

4. In a transistorized electronic regulated power supply in which the emitter-collector circuit of a first transistor is used as a controlled variable impedance in series between a voltage source terminal and an output terminal of the same polarity, and a second transistor with its emitter-collector circuit connected to a voltage source through a load impedance acts as an amplifier connected to control the base of said first transistor from the junction of said second transistor and said load impedance, a circuit for stabilizing said voltage applied to the source end of said load impedance comprising: A source of substantially constant reference voltage, a third transistor connected such that its emitter-collector circuit is between said voltage source and said source end of said load impedance, and the base of said third transistor is connected to said reference voltage, thereby isolating said source of substantially constant reference voltage from the effects of operating current changes through said second transistor.

5. The invention set forth in claim 4, further defined in that said source of substantially constant reference voltage is developed with respect to said output terminal.

6. In a regulator circuit of the character described which is relatively insensitive to input voltage variations; means including a first transistor operating as a current control device having an input and an output, a second transistor energized by a voltage source through a load impedance, said second transistor being adapted to control the base voltage of said first transistor and hence the current through it and further the output voltage of said regulator circuit, and stabilizing means comprising a third transistor operating with a stabilized base voltage, connected to pass the current in said load impedance, and thereby at the same time hold the voltage applied from said voltage source to said load impedance substantially constant.

7. The invention defined in claim 6 in which the base voltage of said third transistor is stabilized with respect to said output of said transistor current control device, and the said voltage applied from said voltage source to said load impedance is thereby held substantially constant with respect to said output of said transistor current control device.

References Cited in the file of this patent
UNITED STATES PATENTS 2,922,945     Norris et al. _____ Jan. 26, 1960
2,932,783     Mohler _____ Apr. 12, 1960